United States Patent [19]

Simko

[11] 4,164,547

[45] Aug. 14, 1979

[54] PROCESS FOR REMOVING SULFUR DIOXIDE IN A WET SCRUBBER

[75] Inventor: Alexander P. Simko, Anchorage, Ky.

[73] Assignee: American Air Filter Company, Inc., Louisville, Ky.

[21] Appl. No.: 794,553

[22] Filed: May 6, 1977

[51] Int. Cl.$^2$ ............................................. B01D 53/34
[52] U.S. Cl. ................................... 423/242; 422/111
[58] Field of Search ................................ 423/242–244, 423/DIG. 5; 23/284, 230 A, 253 A; 422/109–111

[56] References Cited

U.S. PATENT DOCUMENTS

| | | | |
|---|---|---|---|
| 2,021,936 | 11/1935 | Johnstone | 423/242 |
| 3,767,765 | 10/1973 | Gustarsson et al. | 423/242 |
| 3,897,540 | 7/1975 | Onnen | 423/242 |
| 3,914,387 | 10/1975 | Jordon et al. | 423/242 |
| 4,002,724 | 1/1977 | McKie | 423/242 |

*Primary Examiner*—Earl C. Thomas
*Attorney, Agent, or Firm*—Jon C. Winger

[57] ABSTRACT

The method for removing oxides of sulfur from a waste gas stream in a wet scrubber using a controlled amount of a fly ash solution as one of the sulfur dioxide reacting materials.

2 Claims, 4 Drawing Figures

PROCESS FOR REMOVING SULFUR DIOXIDE IN A WET SCRUBBER

BACKGROUND OF THE INVENTION (1) Field of the Invention

The invention relates to a method for removing sulfur dioxide from a flue gas stream and more particularly relates to a method for removing oxides of sulfur from a waste gas stream in a wet scrubber using fly ash as an additive with other sulfur dioxide reactant materials.

(2) Description of the Prior Art

In the combustion of fossil fuels, particularly in steam boilers of electric power plants, fly ash and oxides of sulfur as well as other air polluting materials are by-products of said combustion. In recent years it has become common place to utilize large quantities of coal having large percentages of sulfur therein as a source of combustible material in said electric power plants. In these plants, many different types of systems have been devised for removing the fly ash materials as well as the oxides of sulfur. The most common system utilized is one that includes an electrostatic precipitator and a wet scrubbing tower, the electrostatic precipitator being utilized to remove the fly ash with a wet scrubber being utilized to remove the oxides of sulfur. Generally, the electrostatic precipitators are placed upstream of the wet scrubbing tower and the fly ash is removed first, as well as the other particulate materials in the gas stream, with only oxides of sulfur and other non-particulates remaining in the gas stream. In the removal of the oxides of sulfur from the flue gas stream, the flue gas stream is passed through a wet scrubber in which the scrubbing solution generally includes additives which will chemically combine with the oxides of sulfur to form precipitates which may then be easily removed from the gas stream in slurry form. The additive which is generally used is a calcium containing material such as that obtained from lime or limestone.

As we use more coal in the generation of electric power, it has become common practice to use coal which includes a significant amount of alkali. In this high alkali coal, the coal contains from about 0.3 to 1.5 percent by weight of sulfur and between about 3 and 25 percent by weight of fly ash, the fly ash content having a total calcium, sodium, and magnesium content in the range of from about 8 to 50 percent by weight of the fly ash. However, even though the fly ash is high in alkali, up until the present invention means for utilizing the alkali in the fly ash in an automatically controlled process system had not been found successful.

SUMMARY OF THE INVENTION

According to the present invention, there is provided a method for the removal of oxides of sulfur in a wet scrubber utilizing fly ash. More particularly, the present invention provides for a method and system for removal of sulfur dioxide from a flue gas stream in a wet scrubber utilizing fly ash as one of the sulfur dioxide reactant materials.

In the present invention, a flue gas stream containing sulfur dioxide and fly ash is subjected to treatment in an electrostatic or mechanical precipitator wherein fly ash and other particulates are removed therefrom. The relatively particulate free flue gas containing oxides of sulfur then passes through a wet scrubber wherein the oxides of sulfur are subjected to a sulfur dioxide treating solution including fly ash as one source of alkali for reacting with the sulfur dioxide. The fly ash which is utilized is the product removed from the flue gas stream in the electrostatic or mechanical precipitator and is added to the sulfur dioxide treating solution in the form of a slurry. The addition and amount of fly ash utilized in the process is generally determined by controlling the pH of the scrubbing solution to automatically optimize the operation and economics of the sulfur dioxide removal process.

A plurality of wet scrubbers in parallel are usually utilized in order to accommodate a wide range of flow rates as well as the removal of a wide range of sulfur in the flue gas stream. Thus, several units may be put on-stream for high flow rates with high sulfur contents, but when the oxides of sulfur in the flue gas are relatively low and the flow rate is also low only one or two units may be utilized.

Various other features of the present invention will become obvious to those skilled in the art upon reading the disclosure set forth hereinafter.

More particularly, the present invention provides a process for the removal of oxides of sulfur from a flue gas stream comprising the steps of: introducing a flue gas containing oxides of sulfur to a wet scrubbing device; monitoring the amount of oxides of sulfur to the scrubbing device; introducing simultaneously with the flue gas stream a controlled amount of oxides of sulfur reactant scrubbing solution and a controlled amount of fly ash solution to the scrubber; and, removing a controlled amount of resulting solution from the wet scrubbing device.

BRIEF DESCRIPTION OF THE DRAWING

Referring to the drawing.

DESCRIPTION OF THE PREFERRED EMBODIMENT

Figure 1:
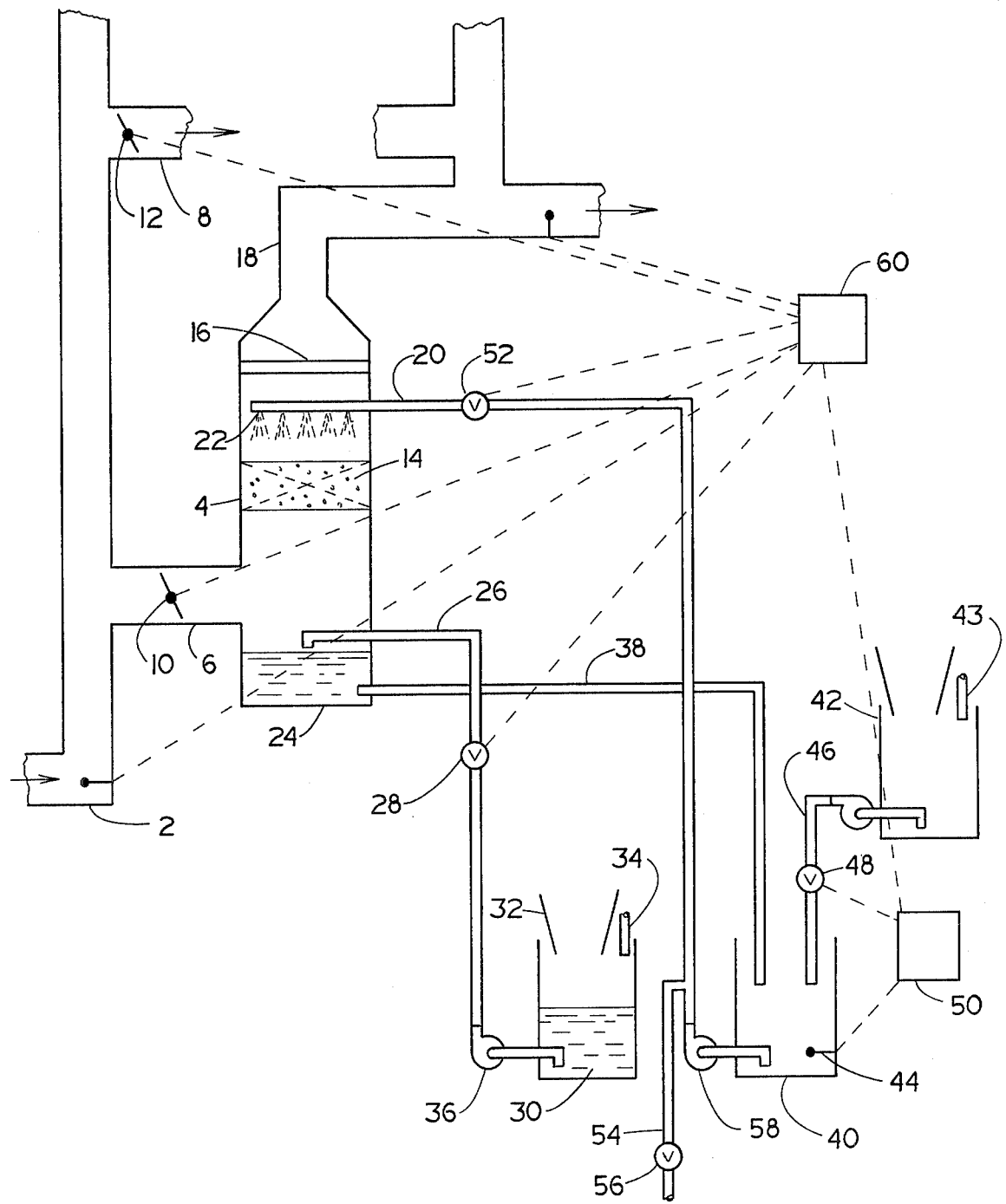
FIG. 1 is a diagrammatical illustration of a process for removing sulfur dioxide in a wet scrubber according to the present invention.

FIG. 1 shows one wet scrubbing system of the present invention in which a flue gas containing oxides of sulfur are removed. A duct 2 receives hot flue gas from a boiler, the flue gas having previously been passed through an electrostatic or mechanical precipitator wherein fly ash, which is high in alkali content has been removed. The boiler and dry fly ash collector are not shown since they may be of any type known in the art. The duct 2 is in flow communication with a wet scrubber 4 through scrubber inlet duct 6.

The quantity of flue gas as well as the sulfur content therein will generally vary considerably so a plurality of wet scrubbers operating in parallel as indicated by only one wet scrubber inlet duct 8 is utilized. In the ducts 6 and 8, dampers 10 and 12, respectively, are disposed to control the flow of flue gases into the wet scrubbers, the positioning of the dampers 10 and 12 being discussed hereinafter.

Wet scrubber 4 is typically provided with a scrubbing section 14 therein for good contact between the flue gases and the scrubbing solution. Also, a mist eliminator 16 is generally provided to prevent carryover of scrubbing solution into the cleaned flue gas outlet duct 18.

The scrubbing solution enters scrubber 4 through line 20, line 20 having a plurality of nozzles 22 therein disposed at preselected spacings therealong to give a uniform spray of spraying solution into the gas stream. Line 20 is spaced above scrubbing section 14 so that the spraying solution sprays down into section 14 providing vapor-liquid mass transfer between the sulfur oxides in the gas and the alkali in the spraying solution. Make-up and control of the scrubbing solution to the wet scrubber 4 will be discussed hereinafter.

The scrubbing solution passing through section 14 thus reacts with oxides of sulfur in the flue gas stream and falls to the bottom 24 of the scrubber 4. A fly ash slurry is introduced into the bottom 24 of scrubber 4 through line 26, the fly ash slurry addition being controlled by the control valve 28. The fly ash slurry is prepared in the fly ash make-up tank 30 wherein fly ash from the previously noted electrostatic precipitators are fed through a hopper 32 into tank 30 and mixed with water from line 34, the resulting slurry being pumped to line 26 by pump 36.

The fly ash slurry from line 26 is mixed in the bottom 24 of the wet scrubber 4 with the slurry formed by the cleaning of the gases passing through the scrubber 4. This resulting slurry is then gravity fed through line 38 to a re-cycle tank 40 where it is mixed with a calcium solution which is prepared in a calcium solution make-up tank 42, tank 42 having a water line 43 therein for use in putting calcium oxide or carbonate into solution.

The re-cycle tank 40 is provided with a pH probe 44 therein which is set to control the addition of supplemental calcium solution to the re-cycle tank 40 through line 46. Line 46 includes a control valve 48 therein which is controlled by a pH control reading which is actuated in response to the pH in the re-cycle tank 40. For example, the pH in the re-cycle tank 40 will be maintained at a pH from about 4 to 8 which is dependent upon the amount of oxides of sulfur to be removed in the waste gas passing through the scrubber 4 and the amount of alkali released from the fyl ash in the scrubber bottom 24.

The sulfur dioxide scrubbing solution from the re-cycle tank 40 is pumped to the scrubber 4 through line 20 discussed hereinbefore, the flow rate of the scrubbing solution being controlled by control valve 52 which is set by conditions to be discussed hereinafter.

A discharge line 54 with a valve 56 is provided on the discharge side of scrubbing solution pump 58 to discharge a predetermined amount of solution from the re-cycle tank 40 when the percent of solids in tank 40 is in the range of from about 5 to 15%, this being the means for removing the solids from the system. Discharge line 54 may be connected with a liquid filtration system or other known means for removing the solids which are high in sulfur.

Figure 2:
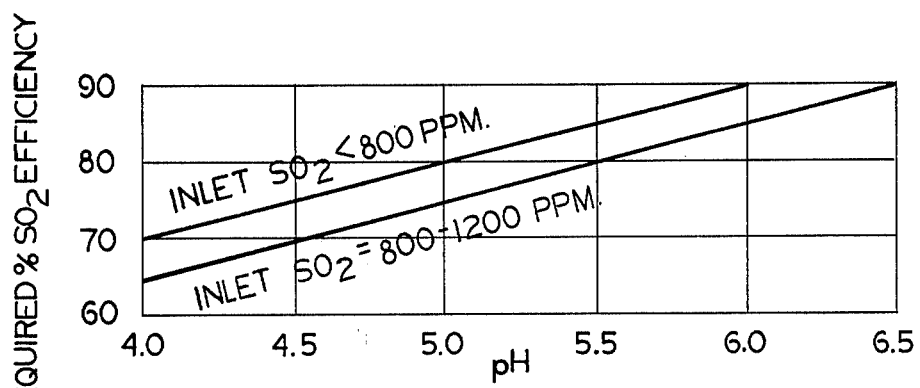
FIG. 2 shows a typical relationship between the sulfur dioxide efficiency of a wet scrubber and the pH of the recycle slurry from the wet scrubber.
Figure 3:
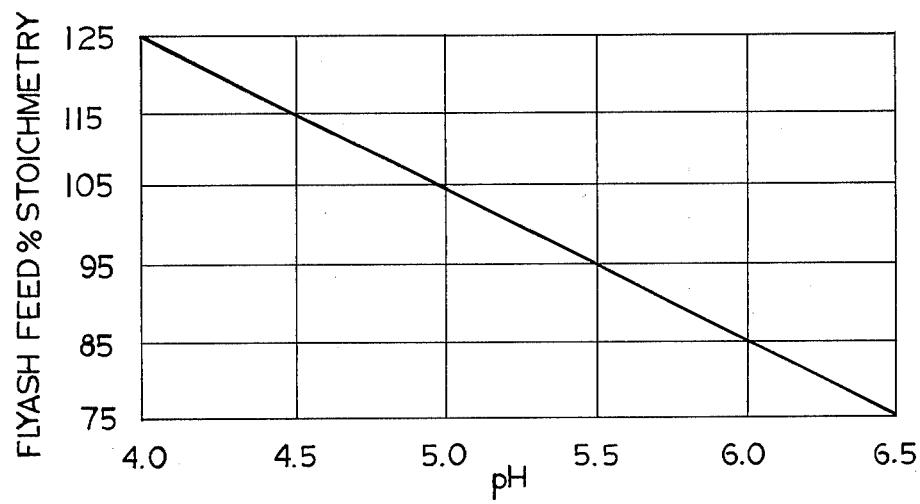
FIG. 3 shows a typical relationship between the stoichiometry of total alkali in a typical rich alkali containing fly ash to the total sulfur dioxide in the flue gas stream and the pH of the recycle slurry; and, FIG. 4 shows that the amount of alkali from the fly ash that will be used will also be a function of pH and can be estimated by the function of "fly ash utilization vs. pH."
Figure 4:
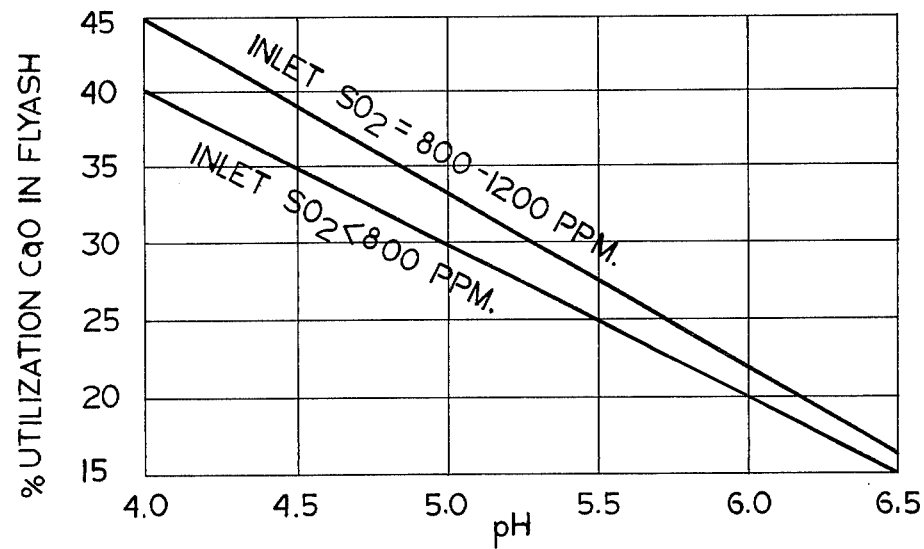

In my invention, I use a means of automatic process control for the optimization of the utilization of the alkali from the fly ash thereby reducing the additional use of alkali from a secondary lime or limestone source. This automatic control is accomplished by a process simulator computer 60 analogue computer which controls the fly ash feed rate tank take 30, the pH set point in tank 40, and the number of scrubbing units to be utilized through inlet duct 2. The simulator 60 is programmed to review the process requirements as determined by the discussion of FIGS. 2-4 hereinafter and determines the optimum criteria for scrubber system operation in the following steps:

(a) a preselected maximum $SO_2$ allowable to the effluent stack is determined, this generally being in line with government code or other regulatory requirements, the $SO_2$ allowable to the stack being computed for a specific boiler load and coal conditions. For example, the $SO_2$ in #/HR can be calculated to allow a maximum of $1.2 \# SO_2/10^6$ Btu heat input from a steam flow rate and coal heat content;

(b) the actual overall $SO_2$ removal efficiency required is calculated to meet the said condition established in (a) for the measured conditions of $SO_2$ flow rate in inlet duct 2. $SO_2$ and gas flow rate can be measured directly by existing devices, such as ultra-violet or infra-red $SO_2$ analyzers which are well known in the art, and flow rate by average point continuous pitot tube analyzers;

(c) determine the minimum number of full size scrubbing units 4 to be operated in parallel from scrubber inlet duct 2 by the total flue gas flow rate and overall required $SO_2$ efficiency previously determined in step (b) above for the specific boiler operating conditions. The simulator 60 then sends a signal to position dampers 10 and 12 to control the flow of flue gas to the number of scrubbing units as established above, it being realized that for more than a two scrubber arrangement, other dampers in parallel with dampers 10 and 12 are also positioned in response to signals from simulator 60;

(d) the simulator 60 calculates the required $SO_2$ efficiency for the scrubbers to meet the overall $SO_2$ efficiency established above in (c). From this required $SO_2$ efficiency, the simulator 60 then establishes the pH set points for pH controller 50 required in recycle slurry 40 to achieve said $SO_2$ efficiency. Within pH's in the range of 4 to 8, the $SO_2$ efficiency increases as the pH is increased for a given flow to the scrubber header 20 through valve 52. This function of $SO_2$ efficiency vs. pH of recycle slurry 15 establishes for each boiler size and coal type, a typical function of which is shown for illustrative purposes in FIG. 2. The pH controller 50 then modulates valve 48 to add alkali make-up from tank 42 to maintain the established pH set point in tank 40; and, (e) the simulator 50 then establishes the amount of fly ash alkali addition to tank 24 as a function of the pH set point as previously established for pH controller 50 in (d) above. This function of fly ash alkali addition to pH of recycle slurry is also established for each boiler size and coal type, a typical function of which is shown for illustrative purposes in FIG. 3. FIG. 3 shows the relationship between the stoichiometry of total alkali in the fly ash to the total $SO_2$ in the flue gas stream and the pH of the recycle slurry. Since only 10 to 60% of the total alkali in the fly ash is actually available for neutralization of $SO_2$ in the liquid phase, more than 100% stoichiometric amounts of fly ash alkali can be added without excess alkali resulting in scaling conditions in the scrubber. The amount of alkali from the fly ash that will be used will also be a function of pH and can be estimated by the function of "Fly ash utilization vs. pH," a typical function of which is given in FIG. 4.

Thus, this invention offers a scrubber system that is capable of very high $SO_2$ efficiencies by means of supplemental lime or limestone addition to tank 40, but does not "waste" alkali for boiler operating conditions that do not require high $SO_2$ removal efficiencies.

As the required efficiency of scrubber units drops, a greater percentage of alkali required is obtained from the fly ash. For many lignitic coal and operating boiler loads, little or no supplemental lime may be required. therefore, the scrubber system can operate at the most economical additive feed for both high and low sulfur lignite coals. Optimum control is accomplished automatically by a variable set point on a pH controller 50 which is maintained by a process simulating computer 60.

It will be realized that various changes may be made to the specific embodiment shown and described without departing from the principles of the present invention.

What is claimed is:

1. A process for the removal of oxides of sulfur from a flue gas stream comprising the steps of:
   (a) introducing flue gas containing $SO_2$ to a wet scrubbing device;
   (b) introducing simultaneously with said flue-gas stream a controlled amount of $SO_2$ reactant scrubbing solution and a controlled amount of fly-ash solution to said scrubber to form a resulting solution;
   (c) monitoring the amount of $SO_2$ to said scrubbing device by establishing a signal to an analog computer, said computer being provided with preselected operating conditions of said process, said computer signalling first flow control means for said $SO_2$ reactant scrubbing solution and second flow control means for said fly-ash solution whereby the amount of $SO_2$ reactant scrubbing solution and the amount of fly-ash solution added to the wet scrubber is determined by said signals from said computer;
   (d) removing a controlled amount of said resulting solution from said wet scrubbing device; and,
   (e) introducing said resulting solution to a recycle tank, reading the pH of said resulting solution in said resulting tank, and adding a controlled amount of an alkali solution to said recycle tank, said control amount being determined by the pH reading, to maintain a preselected pH in said recycle tank at from four to eight, the resulting mixture being said $SO_2$ reactant scrubbing solution; and,
   (f) establishing a signal from the pH reading to said computer, said computer signalling said first and second flow means based on said pH reading and comparing said pH reading with said preselected operating conditions.

2. The process of claim 1, said wet scrubbing device including a plurality of scrubbing units in parallel, each unit being operable in response to the amount of oxides of sulfur to be removed from said flue gas.

* * * * *